US009848371B2

(12) United States Patent
Ko et al.

(10) Patent No.: US 9,848,371 B2
(45) Date of Patent: Dec. 19, 2017

(54) METHOD AND APPARATUS FOR DETERMINING SERVING SUB-CELL IN WIRELESS COMMUNICATION SYSTEM INCLUDING MULTIPLE SUB-CELL

(71) Applicant: Samsung Electronics Co., Ltd., Suwon-si, Gyeonggi-do (KR)

(72) Inventors: Soo-Min Ko, Seoul (KR); Eun-Yong Kim, Yongin-si (KR); Seung-Joo Maeng, Seongnam-si (KR); Seung-Hee Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 14/266,116

(22) Filed: Apr. 30, 2014

(65) Prior Publication Data
US 2014/0335850 A1 Nov. 13, 2014

(30) Foreign Application Priority Data

May 10, 2013 (KR) ........................ 10-2013-0053240

(51) Int. Cl.
*H04W 48/12* (2009.01)
(52) U.S. Cl.
CPC .................... *H04W 48/12* (2013.01)
(58) Field of Classification Search
CPC .............................. H04W 48/12; H04B 7/0626
See application file for complete search history.

(56) References Cited

U.S. PATENT DOCUMENTS

| 2008/0159229 | A1* | 7/2008 | Kim ....................... H04W 36/02 370/331 |
| 2009/0156214 | A1 | 6/2009 | Lee et al. |
| 2010/0056160 | A1* | 3/2010 | Kim .................. H04W 36/0055 455/444 |
| 2010/0177683 | A1 | 7/2010 | Lindoff et al. |
| 2010/0177688 | A1* | 7/2010 | Kishiyama ............ H04J 13/004 370/328 |
| 2011/0103247 | A1* | 5/2011 | Chen .................... H04B 7/0452 370/252 |

(Continued)

FOREIGN PATENT DOCUMENTS

| EP | 2 472 977 A1 | 7/2012 |
| JP | 2012-504365 A | 2/2012 |
| KR | 10-2012-0015282 A | 2/2012 |

*Primary Examiner* — Joseph Dean, Jr.
(74) *Attorney, Agent, or Firm* — Jefferson IP Law, LLP (57) ABSTRACT

A method of determining a serving sub-cell of a terminal among a plurality of sub-cells by a base station in a wireless communication system is provided. The method includes generating reference signal transmission interval information for each of the sub-cells by configuring a reference signal transmission interval for each of the plurality of sub-cells, and transmitting the reference signal transmission interval information for each of the sub-cells to the corresponding sub-cell, receiving channel status information for at least one sub-cell among the plurality of sub-cells from the terminal, and determining a serving sub-cell of the terminal by using at least one of the reference signal transmission interval information, the channel status information, a reception time of the channel status information, of each of the sub-cells.

20 Claims, 6 Drawing Sheets

(56) References Cited

U.S. PATENT DOCUMENTS

| | | | |
|---|---|---|---|
| 2011/0105184 A1* | 5/2011 | Piirainen | H04B 7/022 |
| | | | 455/562.1 |
| 2011/0183669 A1 | 7/2011 | Kazmi | |
| 2012/0039172 A1 | 2/2012 | Kim et al. | |
| 2013/0094384 A1 | 4/2013 | Park et al. | |
| 2013/0163569 A1* | 6/2013 | Lee | H04L 1/0045 |
| | | | 370/336 |
| 2013/0250913 A1* | 9/2013 | Geirhofer | H04L 5/0032 |
| | | | 370/331 |
| 2014/0003262 A1* | 1/2014 | He | H04W 28/08 |
| | | | 370/252 |

* cited by examiner

METHOD AND APPARATUS FOR DETERMINING SERVING SUB-CELL IN WIRELESS COMMUNICATION SYSTEM INCLUDING MULTIPLE SUB-CELL

CROSS-REFERENCE TO RELATED APPLICATION(S)

This application claims the benefit under 35 U.S.C. §119(a) of a Korean patent application filed on May 10, 2013 in the Korean Intellectual Property Office and assigned Serial number 10-2013-0053240, the entire disclosure of which is hereby incorporated by reference.

TECHNICAL FIELD

The present disclosure relates to a method and an apparatus for determining a serving cell of a terminal in a wireless communication system including a plurality of sub-cells. More particularly, the present disclosure relates to a method and an apparatus for determining a serving cell of a terminal in a system in which a plurality of sub-cells share cell identifiers with each other.

BACKGROUND

In a wireless communication system of the related art, each cell has an inherent Physical Cell IDentifier (PCID), and a serving cell is changed through a handover procedure when a terminal moves between cells. Recently however, a system in which a plurality of sub-cells having the same cell identifier and existing in one cell has been introduced. In such a system, when a terminal moves from one sub-cell to another sub-cell, since the cell identifiers of the sub-cells are the same, a handover procedure is not required.

Meanwhile, a Channel Status Information-Reference Signal (CSI-RS) has been introduced in the 3$^{rd}$ Generation Partnership Project Long-Term Evolution (3GPP LTE) release-10, and the CSI-RS is used to allow the terminal to acquire channel status information when a reference signal for demodulation is used for channel estimation. However, it remains difficult to determine a serving cell of a terminal in a wireless communication system including a plurality of sub-cells.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for determining a serving cell of a terminal in a wireless communication system including a plurality of sub-cells.

Another aspect of the present disclosure is to provide a method and an apparatus for configuring an interval where each sub-cell transmits a Channel Status Information-Reference Signal (CSI-RS) in a wireless communication system including a plurality of sub-cells.

Another aspect of the present disclosure is to provide a method and an apparatus for configuring an interval where a terminal transmits channel status information in a wireless communication system including a plurality of sub-cells.

In accordance with an aspect of the present disclosure, a method of determining a serving sub-cell of a terminal among a plurality of sub-cells by a base station in a wireless communication system is provided. The method includes generating reference signal transmission interval information for each of the sub-cells by configuring a reference signal transmission interval for each of the plurality of sub-cells, and transmitting the reference signal transmission interval information for each of the sub-cells to the corresponding sub-cell, receiving channel status information for at least one sub-cell among the plurality of sub-cells from the terminal, and determining a serving sub-cell of the terminal by using at least one of the reference signal transmission interval information, the channel status information, and a reception time of the channel status information, of each of the sub-cells.

In accordance with another aspect of the present disclosure, an apparatus of a base station for determining a serving sub-cell of a terminal among a plurality of sub-cells in a wireless communication system is provided. The apparatus includes a sub-cell reference signal transmission interval determination unit configured to generate reference signal transmission interval information for each of the sub-cells by configuring a reference signal transmission interval for each of the plurality of sub-cells, a transmission/reception unit configured to transmit the reference signal transmission interval information for each of the sub-cells to the corresponding sub-cell, and receive channel status information for at least one sub-cell among the plurality of sub-cells from the terminal, and a serving sub-cell determination unit configured to determine a serving sub-cell of the terminal by using at least one of the reference signal transmission interval information, the channel status information, and a reception time of the channel status information, for each of the sub-cells.

In accordance with another aspect of the present disclosure, a method of determining a serving sub-cell of a terminal among a plurality of sub-cells by the terminal in a wireless communication system is provided. The method includes receiving channel status report interval information from a base station, receiving a reference signal from one of the plurality of sub-cells, generating channel status information by estimating a channel status of the corresponding sub-cell by using the reference signal, and transmitting the generated channel status information to the base station, at the channel status report interval.

In accordance with another aspect of the present disclosure, an apparatus of a terminal for determining a serving sub-cell of the terminal among a plurality of sub-cells in a wireless communication system is provided. The apparatus includes a transmission/reception unit configured to receive channel status report interval information of the terminal from a base station, and receive a reference signal from at least one of the plurality of sub-cells, a channel status estimation unit configured to generate channel status information by estimating a channel status of the corresponding sub-cell by using the reference signal, and a controller configured to control the channel status estimation unit to transmit the generated channel status information from the channel status report interval to the base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the following description of the present disclosure will be based on the 3$^{rd}$ Generation Partnership Project Long-Term Evolution (3GPP LTE) wireless communication system standard, it is merely for the convenience of the description, and the present disclosure is not limited to the LTE communication system. That is, the present disclosure can be expanded and applied to other communication systems.

In the following description, a "base station" may have the same meaning as that of a "cell" and used interchangeably with the word "cell". Further, a macro base station may be referred to in short as the "base station" or the "cell", and a lower cell included within the macro base station is referred to as a "sub-cell".

Before giving a description of the present disclosure, various contents of the present disclosure will be described briefly.

The present disclosure is made for determining a serving cell for a specific terminal when a plurality of sub-cells share the same cell identifier with each other. In the present disclosure, the base station determines, for each sub-cell, information (hereinafter, referred to as "reference signal transmission interval information") on a time interval when the sub-cell transmits a reference signal, and notifies the corresponding sub-cell of the determined information. Further, the base station determines information (hereinafter, referred to as "channel status report internal information") on a time interval when a terminal reports channel statuses of sub-cells, and notifies the terminal of the determined information. Each of the corresponding sub-cells which has received the reference signal transmission interval information transmits a Channel Status Information-Reference Signal (CSI-RS) within the corresponding reference signal transmission interval. Then, whenever receiving reference signals from the sub-cells, the terminal generates channel status information by estimating channel statuses of the corresponding sub-cells, and transmits the generated channel status information to the base station. Thereafter, the base station classifies pieces of the received channel status information by the sub-cells by using a reception time of the channel status information received from the terminal and the reference signal report interval information, and determines a serving sub-cell of the terminal by comparing the classified pieces of channel status information.

In accordance with the present disclosure, the base station can easily determine whether the channel status information received from the terminal corresponds to which sub-cell to easily classify the channel status information. Further, whenever receiving a reference signal from a sub-cell, the terminal should generate channel status information of the corresponding sub-cell to report the generated channel status information to the base station. Thus, it is not required to process information on when a specific sub-cell transmits a reference signal, thereby decreasing the complexity of the terminal.

Hereinafter, embodiments of the present disclosure will be described with reference to the figures.

Figure 1:
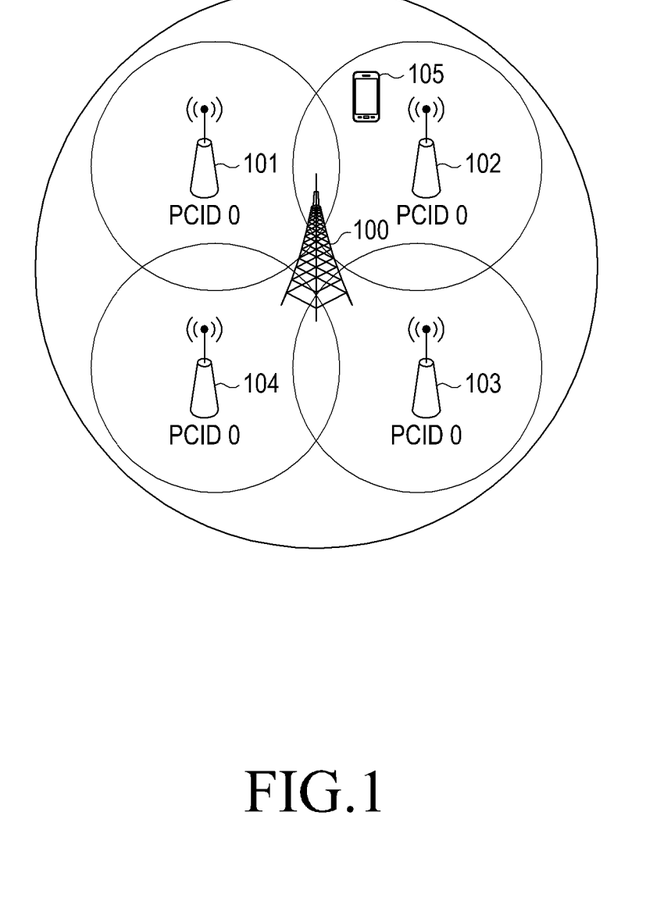
FIG. 1 illustrates a structure of a wireless communication system according to an embodiment of the present disclosure.

FIG. 1 illustrates a structure of a wireless communication system according to an embodiment of the present disclosure.

Referring to FIG. 1, the wireless communication system includes a base station 100 and a plurality of sub-cells 101, 102, 103 and 104 managed by the base station 100. Of course, this is merely for explanation and not intended to be limiting in that the base station 100 may include any number of sub-cells. In the communication system of FIG. 1, Physical Cell IDentifiers (PCIDs) of the sub-cells 101, 102, 103 and 104 are equal to each other. Herein, it is assumed that all of the PCIDs are equal to zero. A terminal 105 is assumed to be currently located within a region of the sub-cell 102. When the terminal 105 moves to another sub-cell, the cell identifiers of the sub-cells 101, 102, 103 and 104 are equal to each other, so a handover is not required. However, switching of a serving sub cell is required.

In the present disclosure, the sub-cells 101, 102, 103 and 104 transmit a CSI-RS (hereinafter, referred to in short as a "reference signal") in order to determine the serving sub-cell by estimating channels of the corresponding sub-cells 101, 102, 103 and 104 through the terminal 105. The terminal 105 generates channel status information for channel status reports of the sub-cells 101, 102, 103 and 104 by using the reference signals of the corresponding sub-cells 101, 102, 103 and 104, and transmits the generated channel status information to the base station 100. The base station 100 determines the serving cell of the terminal 105 by using the channel status information received from the terminal 105. Hereinafter, a method of determining a serving cell according to the present disclosure will be described in more detail.

Figure 2:
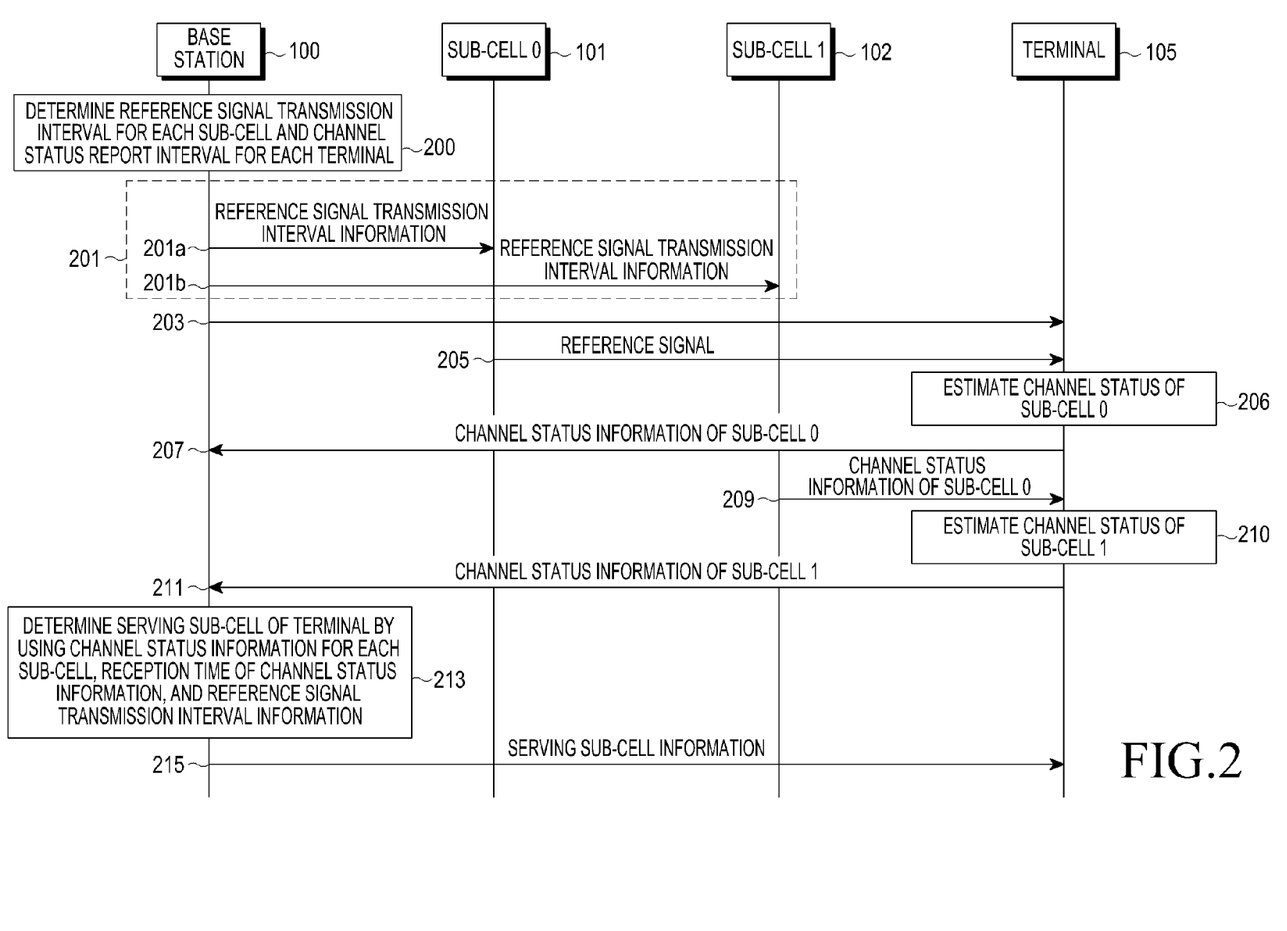
FIG. 2 is a signal flow diagram illustrating a method of determining a serving cell of a terminal according to an embodiment of the present disclosure.

FIG. 2 is a signal flow diagram illustrating a method of determining a serving cell of a terminal according to an embodiment of the present disclosure.

Referring to FIG. 2, the base station 100 generates reference signal transmission interval information by configuring a reference signal transmission interval for each sub-cell in operation 200. Further, the base station 100 generates channel status report interval information by configuring a channel status report interval for each terminal.

The reference signal transmission interval for each sub-cell is configured to be different time intervals for each sub-cell. Herein, it is assumed that a sub-cell 0 101 is configured to transmit a reference signal first and a sub-cell 1 102 is configured to transmit a reference signal next. Further, the channel status report interval can be configured by considering the reference signal transmission interval for each sub-cell, and a clearance interval in which the channel status report is not performed can be configured at a boundary interval of the reference signal transmission interval for each sub-cell. Meanwhile, the channel status report interval information may include information on a channel status report scheme of the terminal. For example, the channel status report interval information may include period information of the channel status report, event information for an aperiodic channel status report when the channel status report is aperiodically performed, etc. The configuring of the reference signal transmission interval and the channel status report interval will be described in more detail with reference to FIG. 3.

In operation 201, the base station 100 transmits the reference signal transmission interval information to the corresponding sub-cell. More specifically, the base station 100 transmits the reference signal transmission interval information to the sub-cell 0 101 in operation 201a, and the base station 100 transmits the reference signal transmission interval information to the sub-cell 1 102 in operation 201b. Although operation 201a and operation 201b are illustrated as different time points in the drawing, the time points of operation 201a and operation 20b may be equal to each other. In operation 203, the base station 100 transmits the channel status report interval information to the terminal 105. For reference, although only one terminal 105 is illustrated in operation 203, the base station 100 will transmit the channel status report interval information to each terminal within a cell region of which the base station 100 is in charge.

In operation 205, the sub-cell 0 101 transmits a reference signal at its own transmission interval according to the received reference signal transmission interval information. In operation 206, the terminal 105 generates channel status information of the sub-cell 0 101 by using the reference signal of the sub-cell 0 101. In operation 207, the terminal 105 transmits the channel status information to the base station 100. At this time, a time point when the channel status information is transmitted is according to the channel status report interval received in operation 203.

In operation 209, the sub-cell 1 102 transmits a reference signal at its own reference signal transmission interval according to the received reference signal transmission interval information. In operation 210, the terminal 105 generates channel status information of the sub-cell 1 102 by using the reference signal of the sub-cell 0 101. In operation 211, the terminal 105 transmits the channel status information to the base station 100. At this time, a time point when the channel status information is transmitted is according to the channel status report interval received in operation 203.

In operation 213, the base station determines a serving sub-cell of the terminal 105 by using the channel status information received from the terminal 105, time information when the channel status information is received, and the reference signal transmission interval information. In more detail, the base station 100 can classify pieces of the received channel status information according to each sub-cell by using the reference signal transmission interval information for each sub-cell generated in operation 200 and reception time information when the channel status information is received in operation 207 and operation 211, and can determine a sub-cell having the best channel status as a serving sub-cell by comparing the pieces of the channel status information for each sub-cell.

In operation 215, the base station 100 transmits the determined serving sub-cell information to the corresponding terminal 105.

Figure 3:
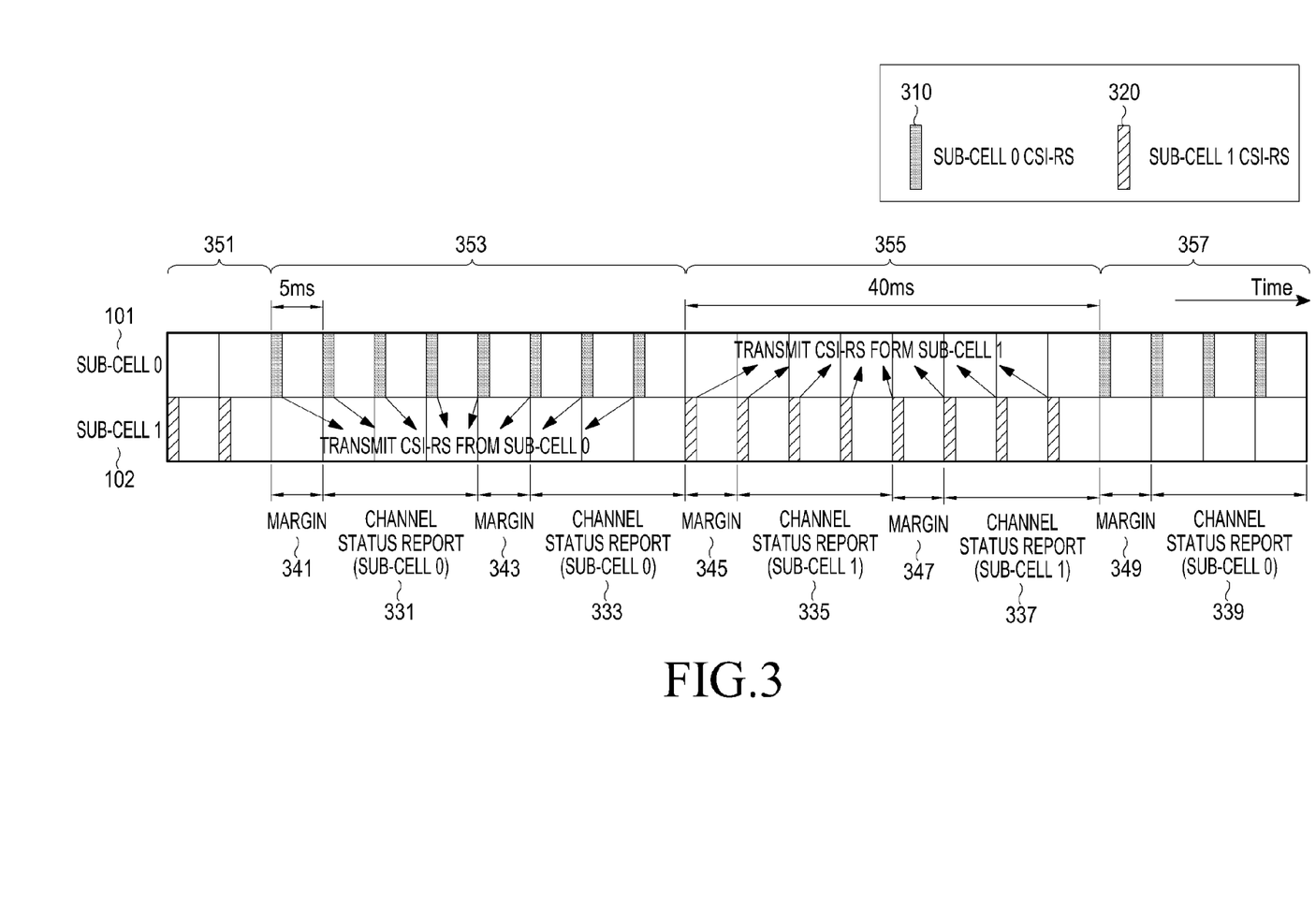
FIG. 3 illustrates an example of configuring a reference signal transmission interval of sub-cells and a channel status report interval of a terminal according to an embodiment of the present disclosure.

FIG. 3 illustrates an example of configuring a reference signal transmission section of sub-cells and a channel status report section of a terminal according to an embodiment of the present disclosure. FIG. 3 is based on an assumption that the number of sub-cells 101 and 102 is two.

Referring to FIG. 3, the base station 100 differently configures the reference signal transmission interval for each sub-cell. In this way, the terminal is not confused by not making different sub-cells transmit the reference signals at the same time interval. For example, in FIG. 3, reference numerals 351 and 355 correspond to reference signal transmission intervals of the sub-cell 1 102, and reference numerals 353 and 357 correspond to reference signal transmission intervals of the sub-cell 0 101. A length of one reference signal transmission interval may be set to be a predetermined value, and it is exemplified in FIG. 3 that the length of the reference signal transmission interval is set to be 40 ms. For reference, reference numerals 351 and 357 illustrate only a part of 40 ms.

An interval in which the sub-cell transmits the reference signal within the reference signal transmission interval may also be set to be a predetermined value, and herein, the interval is set to be 5 ms. Each sub-cell transmits the reference signal according to the aforementioned method of transmitting the reference signal of the sub-cell. Reference numeral 310 denotes that the sub-cell 0 101 transmits the reference signal at each predetermined interval (5 ms) at the reference signal transmission intervals 353 and 357, and reference numeral 320 denotes that the sub-cell 1 102 transmits the reference signal at each predetermined interval (5 ms) at the reference signal transmission intervals 351 and 355.

After configuring the reference signal transmission interval for each sub-cell, the base station 100 configures a channel status report interval of a terminal in consideration of the reference signal transmission interval. At this time, a margin interval during which the terminal does not perform a channel status report can be configured at a boundary of the reference signal transmission interval for each sub-cell. Since reference numeral 341 corresponds to a starting time point of the reference signal transmission interval of the sub-cell 0 101, a margin interval during which the channel estimation report is not performed for a predetermined time period may be configured in the interval 341.

The reason why the margin interval, during which the terminal does not perform the channel status report, is configured in this way will be described as follows. Terminals may have different timings of reference signals referenced for channel status reports, according to the manufacturers thereof. In this case, it may be uncertain whether the channel status information reported by the terminal corresponds to channel status information for a most recently transmitted reference signal or channel status information for a reference signal which is transmitted before the most recently transmitted reference signal. This uncertainty causes a problem especially at the boundary of the reference signal transmission interval in which sub-cells are changed. In such a boundary, when the terminal performs a channel status report (335, 337) for the sub-cell 1 102, the base station may recognize the channel status reports as a channel status report (331, 333, 339) for the sub-cell 0 101. Thus, when a margin interval is configured while the channel status report interval is configured, the possibility of confusion arising on which sub-cell corresponds to the channel status report can be eliminated.

Although it is preferred that the margin interval is configured from the starting time point of the reference signal transmission interval for a predetermined time period, in some cases, a plurality of margin intervals may be configured within one reference signal transmission interval.

In FIG. 3, a starting time point of the first margin interval 341 is configured to be a starting time point of the margin interval 341, and a length of the margin interval 341 is set to be 5 ms. Meanwhile, it is exemplarily illustrated that a start time point of a second margin interval 343 is configured after 15 ms from an end time point of the first margin interval 341. Additional margin intervals 345, 347 and 349 are similarly illustrated.

Meanwhile, a method of performing a channel status report may be differently configured for each terminal. In more detail, a period of the channel status report may be differently configured for each terminal, or the channel status report may be configured to be performed periodically or aperiodically with respect to each terminal. For example, it is possible that the channel status report is periodically performed with a long period with respect to a terminal A, the channel status report is periodically performed with a short period with respect to a terminal B, and the channel status report is aperiodically performed with respect to a terminal C when a specific event is generated or a separate signaling is received from the base station. For a terminal D, when the terminal D is far away from a boundary region between the sub-cells, the channel status report may be periodically performed with a long period, and when the terminal D is adjacent to the boundary region between the sub-cells, the channel status report may be aperiodically performed by receiving a separate signaling from the base station. In this way, the terminal adjacent to the boundary region between the sub-cells can report the channel information more frequently than the terminal far away from the boundary region between the sub-cells.

Information on the method of performing the channel status report for each terminal may be included in the channel status report interval information, transmitted to the terminal by the base station.

Figure 4:
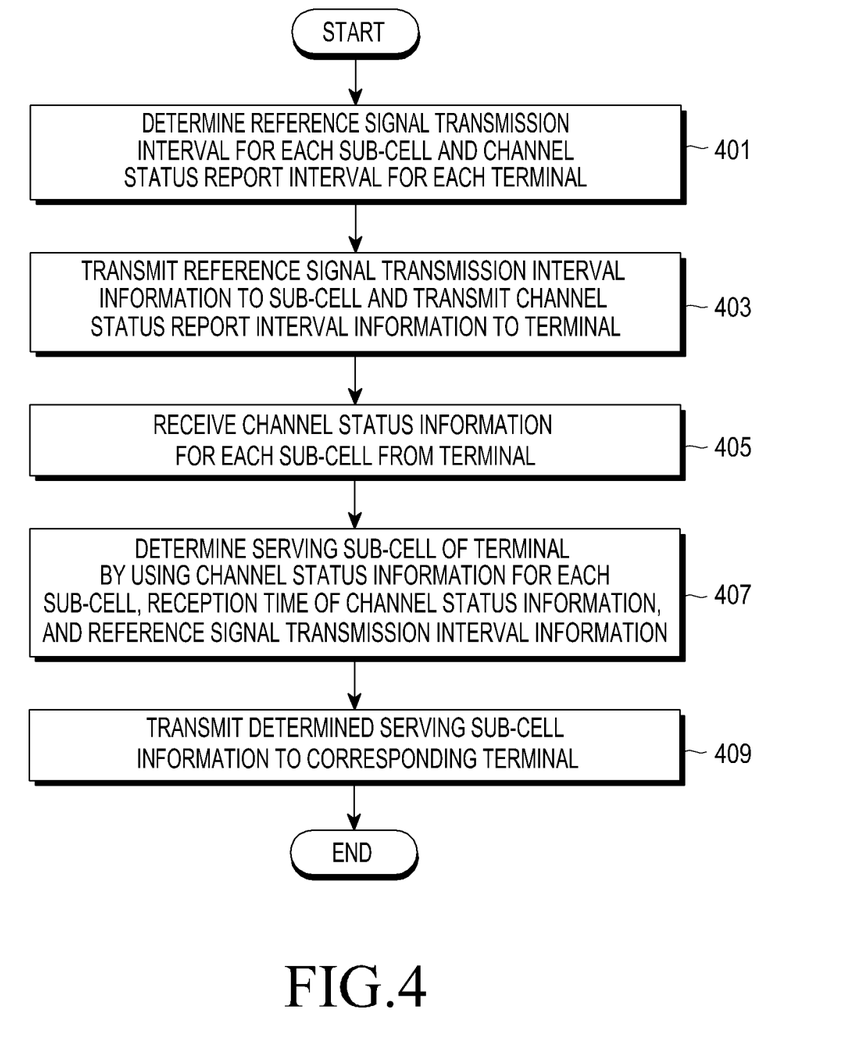
FIG. 4 is a flowchart illustrating an operation of a base station for determining a serving cell of a terminal according to an embodiment of the present disclosure.

FIG. 4 is a flowchart illustrating an operation of a base station for determining a serving cell of a terminal according to an embodiment of the present disclosure.

Referring to FIG. 4, the base station configures a reference signal transmission interval for each sub-cell, and configures a channel status report interval for each terminal in consideration of the reference signal transmission interval in operation 401. A method of configuring the reference signal transmission interval and the channel status report interval may be the same as the method described in FIG. 3.

In operation 403, the base station transmits the reference signal transmission interval information to each sub-cell, and transmits the channel status report interval information to each terminal. In operation 405, the base station receives channel status information for each sub-cell from a specific terminal. The channel status information corresponds to information generated by estimating a channel status for a sub-cell by the specific terminal, using a reference signal transmitted by the corresponding sub-cell at the reference signal transmission interval.

In operation 407, the base station determines a serving sub-cell of the terminal by using the channel status information for each sub-cell, a reception time of the channel status information and the reference signal transmission interval information. For example, the base station can determine whether the channel status information received from the terminal corresponds to which sub-cell to classify the channel status information, by using reception time information for the plurality of pieces of channel status information received from the terminal and the reference signal transmission interval for each sub-cell, configured in operation 401. Thereafter, the sub-cell having the best channel status can be determined as the serving sub-cell by comparing the channel status information for each sub-cell. Thereafter, in operation 409, the base station transmits information on the determined serving sub-cell to the corresponding terminal.

Figure 5:
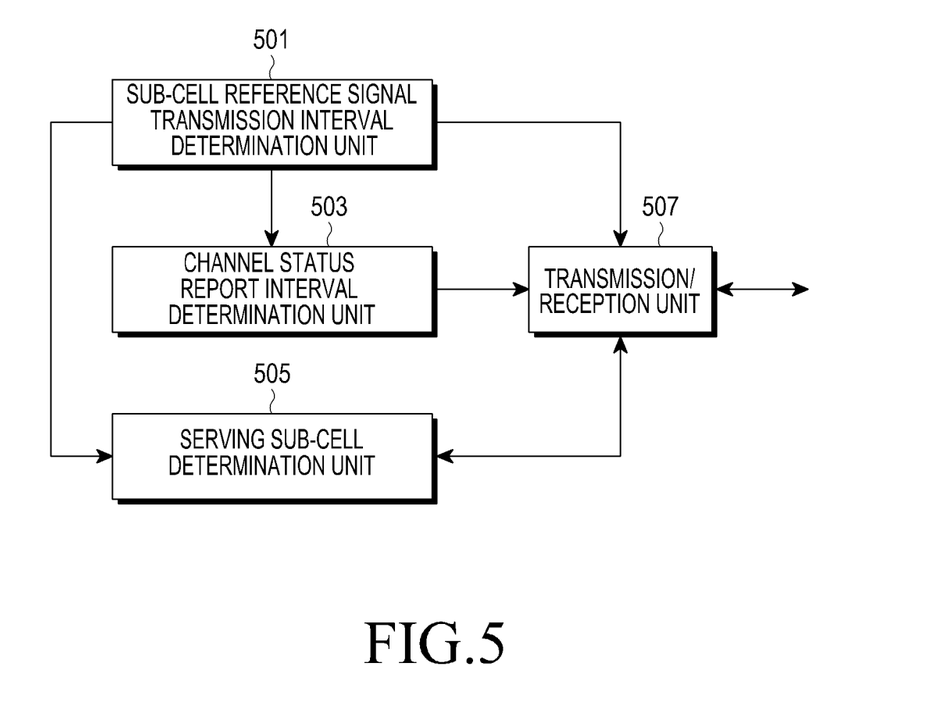
FIG. 5 illustrates an apparatus of a base station for determining a serving cell of a terminal according to an embodiment of the present disclosure.

FIG. 5 illustrates an apparatus of a base station for determining a serving cell of a terminal according to an embodiment of the present disclosure.

Referring to FIG. 5, a sub-cell reference signal transmission interval determination unit 501 configures a reference signal transmission interval for each sub-cell, and transmits the configured reference signal transmission interval to a channel status report interval determination unit 503, a transmission/reception unit 507 and a serving sub-cell determination unit 505.

The channel status report interval determination unit 503 generates channel status report interval information by configuring a channel status report interval for each terminal in consideration of the reference signal transmission interval, and transmits the channel status report interval information to the transmission/reception unit 507. Further, the channel status report interval information may include information on a method of reporting a channel status for each terminal. For example, the channel status report interval information may include period information of the channel status report, event information for an aperiodic channel status report when the channel status report is aperiodically performed, etc.

The transmission/reception unit 507 transmits the reference signal transmission interval information to each sub-cell, and transmits the channel status report interval information to each terminal. Thereafter, the transmission/reception unit 507 receives channel status information for each sub-cell from a specific terminal, and transmits the received channel status information to the serving sub-cell determination unit 505. The channel status information corresponds to information generated by estimating a channel status of a sub-cell by the specific terminal, using a reference signal transmitted by the corresponding sub-cell at the reference signal transmission interval.

The serving sub-cell determination unit 505 determines a serving sub-cell of the terminal by using the channel status information for each sub-cell, the reception time of the channel status information and the reference signal transmission interval information. For example, the serving sub-cell determination unit 505 can determine whether the channel status information received from the terminal corresponds to which sub-cell to easily classify the channel status information, by using reception time information for the plurality of pieces of channel status information received from the terminal and the reference signal transmission interval for each sub-cell. Thereafter, the sub-cell having the best channel status can be determined as the serving sub-cell by comparing the channel status information for each sub-cell.

Figure 6:
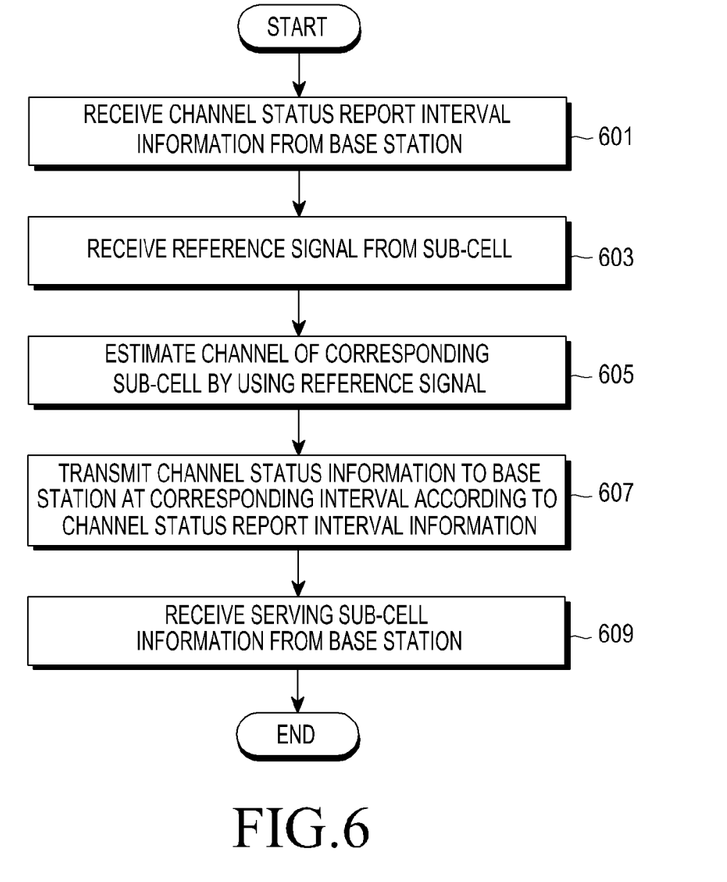
FIG. 6 is a flowchart illustrating an operation of a terminal for determining a serving cell of a terminal according to an embodiment of the present disclosure.

FIG. 6 is a flowchart illustrating an operation of a terminal for determining a serving cell of a terminal according to an embodiment of the present disclosure.

Referring to FIG. 6, the terminal receives channel status report interval information from the base station in operation 601, and receives a reference signal from the sub-cells in operation 603. The channel status report interval information is configured by the base station in consideration of a reference signal transmission interval of each of a plurality of sub-cells, and may be configured such that the terminal does not report a channel status from a start time point of the reference signal transmission interval for each sub-cell for a predetermined margin interval. Further, the channel status report interval information may include period information of a channel status report of the terminal or event information for an aperiodic report of the terminal.

In operation 605, the terminal generates channel status information for each sub-cell by using the reference signals received from the sub-cells. In operation 607, the terminal transmits the channel status information for each sub-cell to the base station. In operation 609, the terminal receives serving sub-cell information from the base station. The serving sub-cell is determined by the base station, by using a reception time of the channel status information for each sub-cell, reference signal transmission interval information for each sub-cell configured by the base station, and the channel status information.

Figure 7:
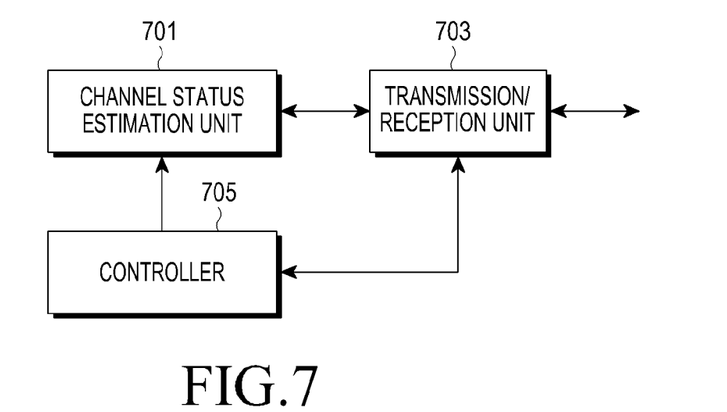
FIG. 7 illustrates a terminal apparatus for determining a serving cell of a terminal according to an embodiment of the present disclosure.

FIG. 7 illustrates a terminal apparatus for determining a serving cell of a terminal according to an embodiment of the present disclosure.

Referring to FIG. 7, a transmission/reception unit 703 receives channel status report interval information of the terminal form the base station, transmits the channel status report interval information to a controller 705, receives a reference signal from a sub-cell, and transmits the reference signal to a channel status estimation unit 701.

The controller 705 controls the channel status estimation unit 701 to generate channel status information from the channel status report interval information, according to the channel status report interval information.

The channel status estimation unit 701 generates the channel status information by estimating a channel of the sub-cell by using a reference signal of the corresponding sub-cell at the channel status report interval, under the control of the controller 705, and transmits the channel status information to the base station through the transmission/reception unit 703.

In accordance with the aforementioned present disclosure, the base station can perform signaling of the reference signal transmission interval and the channel estimation report interval to the sub-cell and the terminal by determining the reference signal transmission interval of the sub-cell and the channel estimation report interval of the terminal, and can more efficiently determine the serving sub-cell of the terminal by easily classifying the channel status information received from the terminal by each sub-cell by using the reception time of the received channel status information, so as to improve a capacity of the wireless communication system. Further, whenever receiving the reference signal from the sub-cell, the terminal should generate the channel status information of the corresponding sub-cell to report the generated channel status information to the base station. Thus, since it is not required to process information on when a specific sub-cell transmits a reference signal, complexity of the terminal is decreased.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of determining a serving sub-cell of a terminal among a plurality of sub-cells by a base station in a wireless communication system, the method comprising:
generating reference signal transmission interval information for each of the sub-cells by configuring a reference signal transmission interval of a reference signal for each of the plurality of sub-cells;
transmitting the reference signal transmission interval information for each of the sub-cells to a corresponding sub-cell;
receiving channel status information for at least one sub-cell among the plurality of sub-cells from the terminal; and
determining the serving sub-cell of the terminal based on the reference signal transmission interval information, the channel status information, and a reception time of the channel status information, of each of the sub-cells.

2. The method of claim 1, wherein the reference signal transmission intervals of the plurality of sub-cells are differently configured for the corresponding sub-cells.

3. The method of claim 1, further comprising:
before the receiving of the channel status information, generating channel status report interval information by configuring a channel status report interval for the terminal; and
transmitting the channel status report interval information to the terminal.

4. The method of claim 3, wherein the configuring of the channel status report interval comprises performing the configuring based on the reference signal transmission interval of each of the plurality of sub-cells.

5. The method of claim 4, wherein the configuring of the channel status report interval is performed such that the terminal does not perform a channel status report from a start time point of the reference signal transmission interval for each of the sub-cells for a predetermined margin interval.

6. The method of claim 3, wherein, if the configuring of the channel status report interval is performed, the channel status report interval information comprises at least one of period information of a channel status report of the terminal and event information for an aperiodic report of the terminal.

7. An apparatus of a base station for determining a serving sub-cell of a terminal among a plurality of sub-cells in a wireless communication system, the apparatus comprising:
a storage configured to store instructions therein;
at least one processor, upon execution of the instructions being configured to: generate reference signal transmission interval information for each of the sub-cells by configuring a reference signal transmission interval for each of the plurality of sub-cells;
a transceiver configured to:
transmit the reference signal transmission interval information for each of the sub-cells to a corresponding sub-cell, and
receive channel status information of a reference signal for at least one sub-cell among the plurality of sub-cells from the terminal,
wherein the at least one processor is further configured to determine the serving sub-cell of the terminal based on the reference signal transmission interval information, the channel status information, and a reception time of the channel status information, for each of the sub-cells.

8. The apparatus of claim 7, wherein the at least one processor is further configured to differently configure the reference signal transmission intervals of the plurality of sub-cells, for each of the corresponding sub-cells.

9. The apparatus of claim 7, wherein the at least one processor is further configured to:
generate channel status report interval information by configuring a channel status report interval for the terminal, and
transmit the channel status report interval information to the terminal through the transceiver.

10. The apparatus of claim 9, wherein the at least one processor is further configured to configure the channel status report interval based on the reference signal transmission interval of each of the plurality of sub-cells.

11. The apparatus of claim 10, wherein the at least one processor is further configured to perform the configuring of the channel status report such that the terminal does not perform a channel status report from a start time point of the reference signal transmission interval for each of the sub-cells for a predetermined margin interval.

12. The apparatus of claim 9, wherein the at least one processor is further configured to perform the configuring of the channel status report based on at least one of:
period information of a channel status report of the terminal, or
event information for an aperiodic report of the terminal, in the channel status report interval information.

13. A method of determining a serving sub-cell of a terminal among a plurality of sub-cells by the terminal in a wireless communication system, the method comprising:
receiving, from a base station, channel status report interval information for each of the plurality of the sub-cells, the channel status report interval information indicating a time interval in which the channel status report for a corresponding sub-cell is transmitted from the terminal to the base station;
receiving reference signals from at least two of the plurality of sub-cells;

generating channel status information by estimating a channel status of the corresponding sub-cell based on the reference signal; and
transmitting the generated channel status information to the base station, at the channel status report interval,
wherein the serving sub-cell of the terminal is determined by the base station, based on the channel status information, a reception time of the channel status information which is a time information when the channel status information is received by the base station, and a reference signal transmission interval information generated by the base station.

14. The method of claim 13, wherein the channel status report interval is configured based on the reference signal transmission interval of each of the plurality of sub-cells.

15. The method of claim 14, wherein the channel status report interval is configured such that the terminal does not perform a channel status report from a start time point of the reference signal transmission interval for each of the sub-cells for a predetermined margin interval.

16. The method of claim 13, wherein the channel status report interval information comprises one of period information of a channel status report of the terminal and event information for an aperiodic report of the terminal.

17. An apparatus of a terminal for determining a serving sub-cell of the terminal among a plurality of sub-cells in a wireless communication system, the apparatus comprising:
a transceiver configured to:
receive, from a base station, channel status report interval information for each of the plurality of sub-cells, the channel status report interval information indicating a time interval in which the channel status report for a corresponding sub-cell is transmitted from the terminal to the base station, and
receive reference signals from at least two of the plurality of sub-cells; and
at least one processor configured to:
generate channel status information by estimating a channel status of a corresponding sub-cell based on the reference signals, and
control the transceiver to transmit the generated channel status information from the channel status report interval to the base station,
wherein the serving sub-cell of the terminal is determined by the base station, based on the channel status information, a reception time of the channel status information which is a time information when the channel status information is received by the base station, and a reference signal transmission interval information generated by the base station.

18. The apparatus of claim 17, wherein the channel status report interval is configured based on the reference signal transmission interval of each of the plurality of sub-cells.

19. The apparatus of claim 18, wherein the channel status report interval is configured such that the terminal does not perform a channel status report from a start time point of the reference signal transmission interval for each of the sub-cells for a predetermined margin interval.

20. The apparatus of claim 17, wherein the channel status report interval information comprises at least one of period information of a channel status report of the terminal and event information for an aperiodic report of the terminal.

* * * * *